United States Patent
Zhang et al.

(10) Patent No.: US 8,743,726 B2
(45) Date of Patent: *Jun. 3, 2014

(54) SYSTEM AND METHOD FOR UNBALANCED RELAY-BASED WIRELESS COMMUNICATIONS

(75) Inventors: Hang Zhang, Nepean (CA); Mo-Han Fong, Ottawa (CA); Peiying Zhu, Kanata (CA); Jianglei Ma, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/422,781

(22) Filed: Mar. 16, 2012

(65) Prior Publication Data

US 2012/0176960 A1 Jul. 12, 2012

Related U.S. Application Data

(63) Continuation of application No. 12/092,764, filed as application No. PCT/CA2006/001843 on Nov. 10, 2006, now Pat. No. 8,155,016.

(60) Provisional application No. 60/735,767, filed on Nov. 12, 2005.

(51) Int. Cl.
*H04J 1/18* (2006.01)
*H04W 4/00* (2009.01)
*H04L 12/28* (2006.01)
*H04B 7/00* (2006.01)

(52) U.S. Cl.
USPC ........... 370/252; 370/328; 370/338; 370/389; 455/517

(58) Field of Classification Search
None
See application file for complete search history.

(56) References Cited

U.S. PATENT DOCUMENTS

| | | | |
|---|---|---|---|
| 5,761,194 A | 6/1998 | Bahlenberg | |
| 6,275,703 B1 | 8/2001 | Kalev | |
| 7,515,559 B2 | 4/2009 | Koo et al. | |
| 7,599,341 B2 | 10/2009 | Ramachandran | |
| 7,813,695 B2 | 10/2010 | Haartsen | |
| 8,155,016 B2 * | 4/2012 | Zhang et al. | 370/252 |
| 2004/0203911 A1 | 10/2004 | Masuda et al. | |
| 2005/0159166 A1 | 7/2005 | Jonsson et al. | |
| 2005/0232183 A1 | 10/2005 | Sartori et al. | |

(Continued)

FOREIGN PATENT DOCUMENTS

WO    9704613 A1    2/1997

OTHER PUBLICATIONS

Eklund, Carl et al., "IEEE Standard 802.16: A Technical Overview of the WirelessMAN Air Interface for Broadband Wireless Access," IEEE Communications Magazine, Jun. 2002, pp. 98-107.*

(Continued)

*Primary Examiner* — Donald Mills
(74) *Attorney, Agent, or Firm* — Meyertons, Hood, Kivlin, Kowert & Goetzel, P.C.

(57) ABSTRACT

A method and system for wireless communication with a mobile device in which wireless communication is established with the mobile device. A base station is used to transmit directly to the mobile device in a downlink direction. A relay node is used to transmit to the base station communications received in an uplink direction from the mobile station. The relay node relays at least a portion of the uplink traffic received from the mobile station to the base station.

20 Claims, 5 Drawing Sheets

(56) References Cited

U.S. PATENT DOCUMENTS

| | | |
|---|---|---|
| 2005/0243762 A1* | 11/2005 | Terry et al. .................... 370/328 |
| 2006/0141929 A1 | 6/2006 | Lockie et al. |
| 2007/0014252 A1 | 1/2007 | Chung et al. |
| 2007/0076684 A1 | 4/2007 | Lee et al. |

OTHER PUBLICATIONS

International Search Report and Written Opinion dated Feb. 23, 2007 for International Application No. PCT/CA2006/001843, International Filing Date: Nov. 10, 2006 consisting of 9-pages.

* cited by examiner

| SYNTAX | SIZE (bits) |
|---|---|
| Management message type | 8 |
| Number of report types | 2 |
| For (number of report types) { | |
| Report type | 2 |
| If (Report type == 00 ) { | |
| Number of ranging code captured | 4 |
| For (Number of ranging code captured) { | |
| Ranging code attributes | 32 |
| if (ranging code index == initial ranging code index) { | |
| Timing adjust | 4 |
| Power level adjust | 1 |
| Offset frequency adjust | 4 |
| Ranging status } | 1 |
| } | |
| } | |
| If (Report type == 01 ) { | |
| Num of CQI collected | 4 |
| CQI payload collected } | Num of CQI collected x 5 (for 5-bit CQICH) or x6 (for 6-bit CQICH) |
| if (Report type == 10) { | |
| Num of ACH collected | 4 |
| ACH payload collected } | 1x number of ACH collected |
| if (Report type == 11) { | |
| Num of UL H ARQ status report | 4 |
| UL H ARQ status } | 1 x Num of UL - HARQ status report |
| } | |
| } | |

FIG. 6

SYSTEM AND METHOD FOR UNBALANCED RELAY-BASED WIRELESS COMMUNICATIONS

CROSS-REFERENCE TO RELATED APPLICATIONS

This application is a Continuation of U.S. National Stage patent application Ser. No. 12/092,764, filed May 6, 2008, which is a Submission Under 35 U.S.C. §371 for U.S. National Stage Patent Application of International Application Number: PCT/CA2006/001843, filed Nov. 10, 2006, entitled SYSTEM AND METHOD FOR UNBALANCED RELAY-BASED WIRELESS COMMUNICATIONS, which is related to and claims priority to U.S. patent application Ser. No. 60/735,767, filed Nov. 12, 2005, the entirety of all of which are incorporated herein by reference.

STATEMENT OF THE TECHNICAL FIELD

The present invention relates to the field of wireless communications and more particularly to a method and system for providing communications using wireless relay networks in an unbalanced uplink and downlink arrangement.

DESCRIPTION OF THE RELATED ART

As the demand for high speed broadband networking over wireless communication links increases, so too does the demand for different types of networks that can accommodate high speed wireless networking. For example, the deployment of Institute of Electrical and Electronic Engineers ("IEEE") 802.11 wireless networks in homes and business to create Internet access "hot spots" has become prevalent in today's society. However, these IEEE 802.11-based networks are limited in bandwidth as well as distance. For example, maximum typical throughput from a user device to a wireless access point is 54 MB/sec. at a range of only a hundred meters or so. In contrast, while wireless range can be extend through other technologies such as cellular technology, data throughput using current cellular technologies is limited to a few MB/sec. Put simply, as the distance from the base station increase, the need for higher transmission power increases and the maximum data rate typically decreases. As a result, there is a need to support high speed wireless connectivity beyond a short distance such as within a home or office.

As a result of the demand for longer range wireless networking, the IEEE 802.16 standard was developed. The IEEE 802.16 standard is often referred to as WiMAX or less commonly as WirelessMAN or the Air Interface Standard. This standard provides a specification for fixed broadband wireless metropolitan access networks ("MANs") that use a point-to-multipoint architecture. Such communications can be implemented, for example, using orthogonal frequency division multiplexing ("OFDM") communication. OFDM communication uses a spread spectrum technique distributes the data over a large number of carriers that are spaced apart at precise frequencies. This spacing provides the "orthogonality" that prevents the demodulators from seeing frequencies other than their own.

The IEEE 802.16 standard supports high bit rates in both uploading to and downloading from a base station up to a distance of 30 miles to handle such services as VoIP, IP connectivity and other voice and data formats. Expected data throughput for a typical WiMAX network is 45 MBits/sec. per channel. The 802.16e standard defines a media access control ("MAC") layer that supports multiple physical layer specifications customized for the frequency band of use and their associated regulations. This MAC layer uses protocols to ensure that signals sent from different stations using the same channel do not interfere with each other "collide". However, the 802.16e standard does not provide support for multi-hop networks.

IEEE 802.16 networks, such as IEEE 802.16j networks, can be deployed as multi-hop networks from the subscriber equipment to the carrier base station. In other words, in multi-hop networks, the mobile station can communicate with the base station directly or through an intermediate device.

As noted above, the IEEE 802.16e standard does not support multi-hop networks. This standard also does not address improving the uplink (mobile station to base station peak to average power ratio ("PAPR") while reducing the imbalance in the uplink to downlink (base station to mobile station) budget. PAPR issues result from the fact that the mobile station can not transmit with as much power as the base station and because the mobile device is often in motion. The resultant imbalance in the uplink ("UL") to downlink ("DL") budget results from the difference in the PAPRs in the UL and DL directions. For example the typical uplink PAPR for an orthogonal frequency division multiplexing ("OFDM") wireless communication system is less than the PAPR for the downlink. One solution to addressing these problems is the use of a relay. However, while the IEEE 802.16j standard for supporting multi-hop networks has been proposed, this standard also does not provide a method or arrangement for improving PAPR or a way to reduce the imbalance in the uplink to downlink budget. Further, the use of a relay in the DL is inherently complex. As such, it is desirable to have an arrangement that uses a relay to improve the uplink PAPR while reducing the imbalance in the uplink to downlink budget. It is further desirable to provide this arrangement in a manner that does not require a complex relay or set of implantation details and protocols.

SUMMARY OF THE INVENTION

The present invention advantageously provides a method and system that uses unbalanced wireless communications between a mobile station and the base station through the use of a stationary wireless relay. This unbalanced communication is implemented by using the relay only to relay transmissions in the UL direction. In the DL direction, the base station transmits directly to the mobile station without the use of the relay.

In accordance with one aspect, the present invention provides a method for wireless communication with a mobile device in which wireless communication is established with the mobile device. A base station is used to transmit directly to the mobile device in a downlink direction. A relay node is used to transmit to the base station communications received in an uplink direction from the mobile station. The relay node relays at least a portion of the uplink traffic received from the mobile station to the base station.

In accordance with another aspect, the present invention provides a system for wireless communications with a mobile station in which a base station engages in wireless communication directly with the mobile station in a downlink direction. A relay node engages in wireless communication with the mobile station in an uplink direction and relays at least a portion of the uplink traffic received from the mobile station to the base station.

In accordance with still another aspect, the present invention provides a base station for wireless communications with a mobile station and a relay node. The base station includes a transmitter and a receiver. The transmitter directly engages in communications with the mobile station and the relay node in a downlink direction. The receiver receives wireless communications from the relay node in an uplink direction. The mobile station communicates with the base station in the uplink direction via the relay node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 6 is a table of an exemplary arrangement of a MAC layer management response report message constructed in accordance with the principles of the present invention.

DETAILED DESCRIPTION OF THE PREFERRED EMBODIMENTS

As an initial matter, reference may be made herein to "data plane" and "control plane." In general, the control plane includes configured or signaled information that determines the overall behavior, mappings, resource allocation and forwarding parameters that can be applied to all connection frames or frames of a service class. Such information is typically established and used to set up the network devices before any payload traffic is transmitted. Data plane refers to the frame processing functions that typically take place in real-time on a frame-by-frame basis.

In accordance with embodiments of the invention, various MAC control plane embodiments for use in wireless networks using relays are described. While certain embodiments are discussed in the context of wireless networks operating in accordance with the IEEE 802.16 broadband wireless standard, which is hereby incorporated by reference, the invention is not limited in this regard and may be applicable to other broadband networks including those operating in accordance with other OFDM orthogonal frequency division ("OFDM")-based systems including the 3rd Generation Partnership Project ("3GPP") and 3GPP2 evolutions. Similarly, the present invention is not limited solely to OFDM-based systems and can be implemented in accordance with other system technologies, e.g., CDMA.

Figure 1:
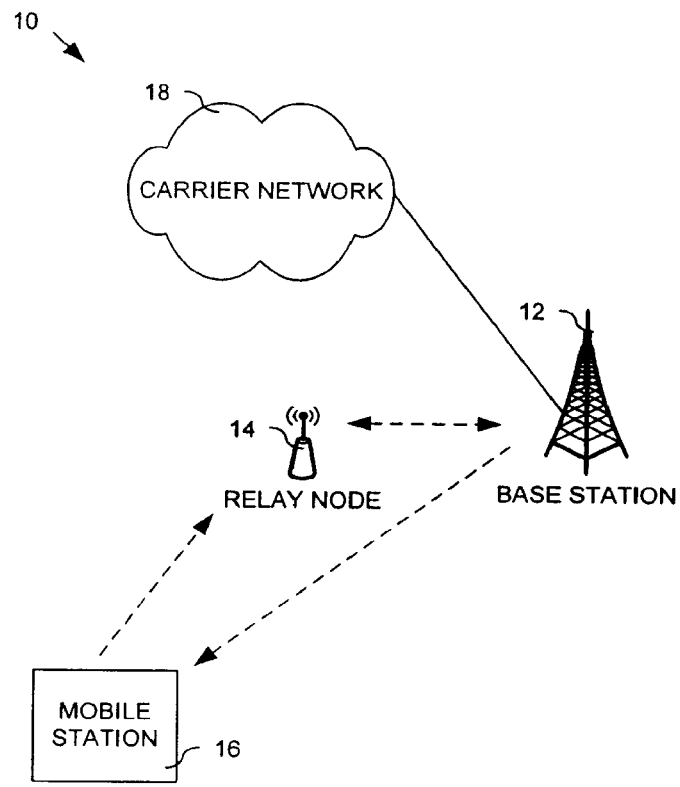
FIG. 1 is a diagram of a system constructed in accordance with the principles of the present invention.

Referring now to the drawing figures in which like reference designators refer to like elements, there is shown in FIG. 1, a system constructed in accordance with the principles of the present invention and designated generally as "10." System 10 includes base station 12, relay node 14 and mobile station 16. Base stations 12 communicate with one another and with external networks, such as the Internet (not shown), via carrier network 18. Base stations 12 engage in wireless communication with relay nodes 14 and/or mobile stations 16. Similarly, mobile stations 16 engage in wireless communication with relay nodes 14 and/or base stations 12.

Base station 12 can be any base station arranged to wirelessly communicate with relay nodes 14 and/or mobile stations 16. Base stations 12 include the hardware and software used to implement the functions described herein to support the MAC control plane functions. Base stations 12 include a central processing unit, transmitter, receiver, I/O devices and storage such as volatile and nonvolatile memory as may be needed to implement the functions described herein. As is described below in detail, the transmitter directly engages in communications with the mobile station 16 and the relay node 14 in a downlink direction. The receiver receives wireless communications from the relay node 14 in an uplink direction. The mobile station 16 communicates with the base station 12 in the uplink direction via the relay node 14.

Mobile stations 16 can be any mobile station including but not limited to a computing device equipped for wireless communication, cell phone, wireless personal digital assistant ("PDA") and the like. Mobile stations 16 also include the hardware and software suitable to support the MAC control plane functions needed to engage in wireless communication with base station 12 either directly or via a relay node 14. Such hardware can include a receiver, transmitter, central processing unit, storage in the form of volatile and nonvolatile memory, input/output devices, etc.

Relay node 14 is used to facilitate wireless communication between mobile station and base station 12 in the uplink (mobile station 16 to base station 12) and/or the downlink (base station 12 to mobile station 16). A relay node 14 configured in accordance with the principles of the present invention includes a central processing unit, storage in the form of volatile and/or nonvolatile memory, transmitter, receiver, input/output devices and the like. Relay node 14 also includes software to implement the MAC control plane functions described herein. Of note, according to an embodiment, base stations 12 and relay nodes 14 implemented in accordance with the principles of the present invention are fixed, i.e. non-moving devices, but the invention is not limited to such. It is contemplated that these devices may move. Mobile stations 16 can be fixed, stationary or moving.

FIG. 1 shows unbalanced relay operation. As is shown by the dashed lines in FIG. 1, mobile station 16 communicates with base station 12 via relay node 14 in the uplink direction only. Base station 12 communicates in the downlink direction directly with mobile station 16. Base station 12 is also shown as engaging in bi-directional communication with relay node 14 so that base station 12 can receive data from mobile station 16 via relay node 14 and engage in MAC control plane communications with relay node 14. The unbalanced relay arrangement shown in FIG. 1 relieves mobile station 16 from concerns over the peak to average power ratio ("PAPR") and reduces the unbalance in the downlink ("DL")/uplink ("UL") link budget. Such occurs, for example, because the base station 12 is capable of much higher power transmission and is much more sensitive on the receiving side than mobile station 16 for wireless communications such as orthogonal frequency division multiplexed ("OFDM") communications. In other words, within a given area supported by base station 12, using an unbalanced communication arrangement such as that shown in FIG. 1 allows a more even transmission power arrangement on the uplink and downlink because mobile station 16 can communicate with relay node 14 in the UL direction, which is presumably closer to mobile station 16 than base station 12 (at least for purposes of the present invention). In addition, the present arrangement as is shown in FIG. 1 does not require any implementation or programmatic software changes or enhancements to mobile station 16 or base station 12 with respect to downlink communication because such is accomplished directly between base station 12 and mobile stations 16 as is known in the art.

In the uplink direction, base station 12 schedules uplink transmission for mobile station 16 and relay node 14. Mobile station 16 makes its uplink transmission which is received and decoded by relay node 14. Relay node 14 relays the traffic to base station 12. Instead of ranging to base station 12, mobile station 16 ranges to relay node 14. As used herein, the term "ranging" is used as understood by one of ordinary skill in the art. "Ranging" refers to the process used in OFDM wireless communications to adjust the arrival time for different mobile stations 16 communicating with a single base station 12. The ranging process is also used to establish the transmit power for mobile station 16. The ranging process is analogous to a "handshake" between mobile station 16 and its communication partner, i.e. relay node 14, in the uplink direction.

The inclusion of relay node 14 in the embodiment shown in FIG. 1 is transparent to mobile station 16. In other words, because DL communication comes from base station 12 and not relay node 14, mobile station does not know that its UL communication is not directly with base station 12 and is instead with relay node 14. This arrangement provides a suitable low-cost, fixed relay node implementation embodiment. With respect to MAC enhancement, no additional MAC capability, e.g., downlink re-fragmentation, scheduling, etc., is needed in this embodiment. Such management messages might include, for example, a relay node report message that allows a relay node to report ranging codes, channel quality index channel and downlink hybrid automated repeat request ("HARQ") error control method acknowledgement channels and combined uplink traffic HARQ status messages for multiple mobile stations 16. Another MAC management message may include a message sent by base station 12 to relay node ("RN") 14 which enables base station 12 to indicate the uplink connection identifications supported communication sessions to a regional node for monitoring and relaying.

Because base station 12 communicates directly with mobile station 16 in the downlink ("DL") direction, no change to DL connection and communication processes is required from current standards and protocols such as those used for orthogonal frequency division multiplexing ("OFDM") or those proposed under IEEE 802.16. In the uplink ("UL") direction, relay node 14 is used for communication as noted above. In the UL case, base station 12 schedules the UL transmission. At mobile station 16 transmits in the UL direction, and relay node 14 decodes the UL traffic received from mobile station 16 and relays the traffic to base station 12. Mobile station 14 "ranges" to relay node 14 with the ranging being controlled by base station 12.

In terms of operation, the present invention advantageously provides an operation that is transparent to mobile station 16, thereby allowing current mobile stations to operate with relay node 14. Enhancement to the MAC layer is provided to support relay nodes 14. However, while the present invention provides new management messages to facilitate operation between mobile stations 16 and relay nodes 14, and between relay node 14 and base station 12, the present invention allows existing relay node pilot design, downlink re-fragmentation, scheduling, etc., to be used.

The present invention provides an arrangement to facilitate initial access of mobile station 16 into a wireless communication network having relay node 14. Arrangements for UL traffic transmission constructed in accordance with the principles of the present invention as well as those related to UL control channel payload relay are described. Bandwidth request, periodic ranging and handoff ("HO") ranging for system 10 are also described. Finally, new MAC management messages to support the arrangement shown in FIG. 1 are described.

Figure 2:
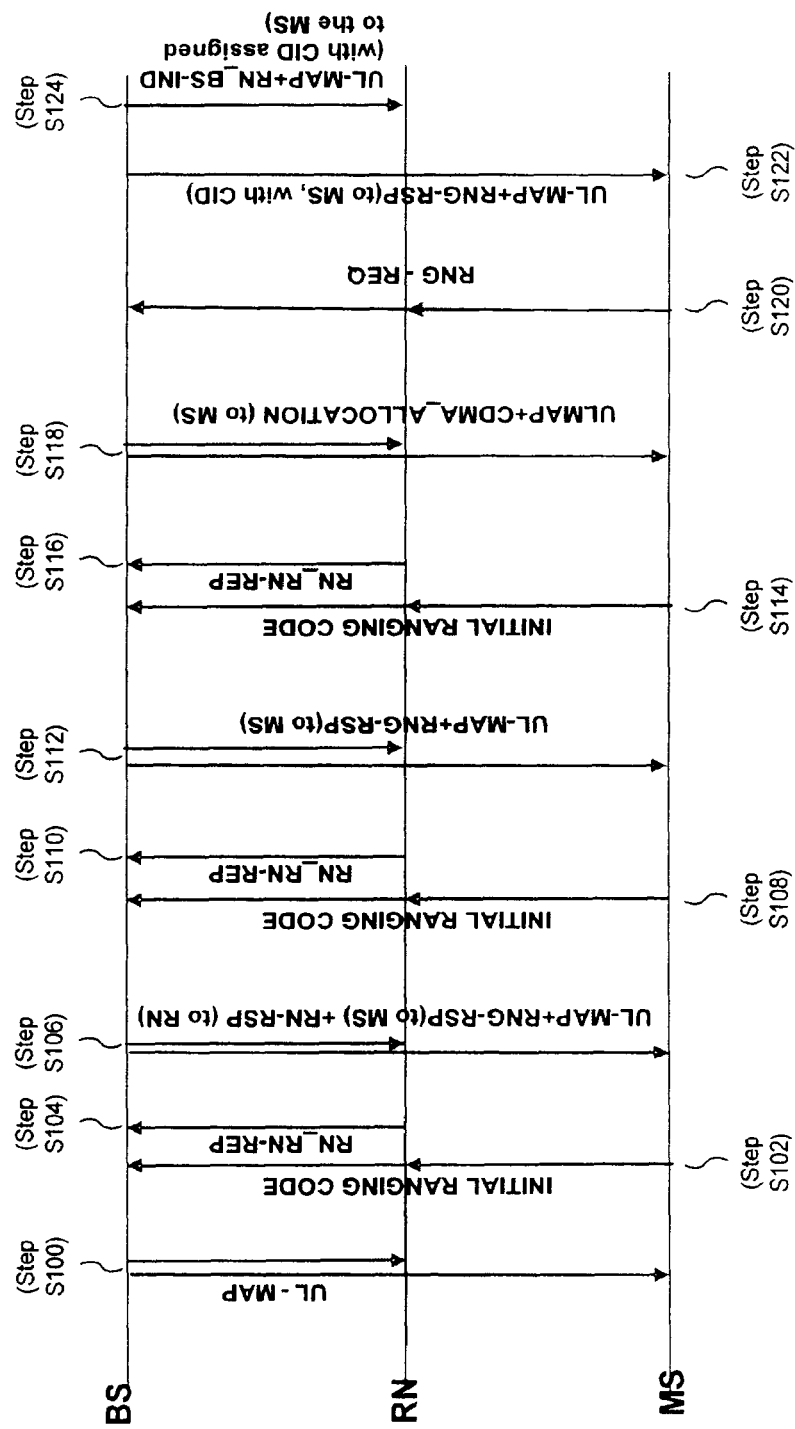
FIG. 2 is an information flow diagram of a mobile station entry process in accordance with the principles of the present invention.

The initial access process is used to allow base station 12 to know which relay node 14 is supporting mobile station 16. Further, it is contemplated that more than one relay node 14 can support a mobile station 16. The mobile station 16 initial access process is described with reference to the information flow diagram shown in FIG. 2. Initially, mobile station 16 performs DL synchronization and reads the UL-MAP transmitted by base station 12 (Step S100). Relay node 14 also receives and reads the UL-MAP. Mobile station 16 then sends an initial ranging code to base station 12 (Step S102). The initial ranging code is also received by relay node 14 (Step S102). One or more relay nodes 14 detect the transmission of the initial ranging code and report the same to base station 12 through a response MAC management message (Step S104). As used herein, the MAC management response message is indicated as ("RN_RN-REP"). The RN_RN-REP MAC management message includes ranging code attributes such as those used for power and timing adjustment to allow mobile station 16 to range to relay node 14.

Base station 12 reserves UL resources for each relay node 14 to allow relay node 14 to send the RN_RN-REP MAC management response message. Base station 12 determines the capturing relay node 14 (defined herein as the "C-RN") that the C-RN 14 will be responsible for capturing UL transmission for the mobile station 16 (Step S106). Base station 12 informs the C-RN 14 using an indication message, defined herein as an "RN_RN-ND" message. Also in Step S106, base station 12 informs mobile station 16 of the ranging code and power and timing adjustment through a ranging response MAC management message, defined herein as a "RNG-RSP" message, that is sent along with the UL-MAP. Ranging continues in Step S108 in which mobile station 16 sends an initial ranging code to base station 12. As with Step S102, relay node 14 also receives the initial ranging code and sends an RN_RN-REP reporting message to base station 12 (Step S110) once relay node 14 determines the power and timing adjustment. In other words, power and time adjustment information is transmitted by relay node 14 to base station 12 using an RN_RN-REP management message. As shown in Steps S114 and S116, the procedure continues until the time and power of mobile station 16 transmission are aligned. Of note, relay node 14 monitors the UL-MAP for UL ranging region information elements. Once initial ranging is complete, base station 12 transmits the UL-MAP and the code division multiple access ("CDMA") allocation information to mobile station 16 (Step S118). This transmission is monitored by relay node C-RN14. From time to time, mobile station 16 sends a ranging request message, (shown as Step S120) to ensure power and time alignment. This message is monitored by relay node 14.

Base station 12 transmits the UL-MAP, RNG-RSP message to mobile station 16 along with the assigned UL connection IDs ("CID") (Step S122). CID refers to identifications corresponding to a communication session between mobile station 16 and base station 12. The UL-MAP includes information elements ("IE") which define what communication resources are allocated to which mobile stations. Base station 12 also sends the UL-MAP and informs relay node 14 of all UL CIDs assigned to mobile station 16 using a base station indication message (defined as "RN_BS-IND") (Step S124). This arrangement advantageously enables the C-RN 14 to monitor the UL transmission of mobile station 16 without requiring other DL messages (with the exception of the DL-MAP and UL-MAP). As is readily observable in FIG. 2, the entire initial access procedure is transparent to mobile station 16, i.e., mobile 16 ranges to an RN 14 as it would range to station 12.

Once the mobile station 16 initial access procedure has been completed, mobile station 16 is able to engage in transmission of uplink traffic. As noted above, with respect to initial access, C-RN 14 obtains the UL CIDs of mobile station 16 through the RN_BS-IND MAC message. C-RN 14 monitors the UL-MAP for uplink resource allocation of mobile station 16.

Because C-RN 14 monitors the UL-MAP and knows what resources are allocated to what mobile stations, and knows the CIDs of the mobile stations, C-RN 14 can detect and relay UL transmission of mobile station 16. The present invention also supports UL hybrid automated repeat request ("HARQ") operation. The present invention provides two embodiments for UL HARQ operation.

The first embodiment for UL HARQ operation is described with reference to the information flow diagram of FIG. 3. In accordance with the first HARQ embodiment, one or more transmissions received from a mobile station 16 are combined by C-RN 14 and reported to base station 12. Base station 12 creates the UL HARQ acknowledgement/no acknowledgement ("ACK/NACK") and transmits the UL HARQ ACK/NACK message to mobile stations 16. Regarding resource assignment for C-RN 14 with respect to relaying UL traffic, for this embodiment, C-RN 14 is allocated enough channel resources by base station 12 for successful transmission. This arrangement may waste some channel resources and may delay transmission by one or more frames.

Figure 3:
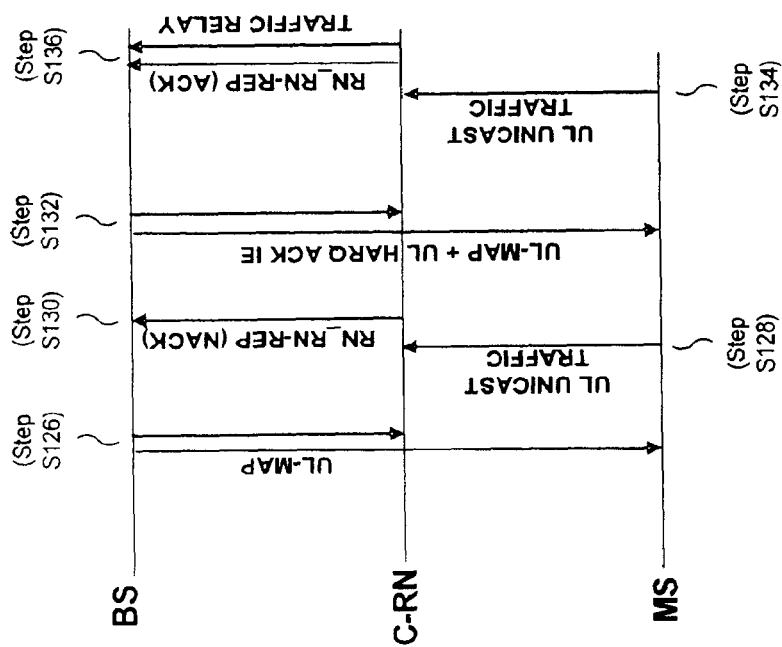
FIG. 3 is an information flow diagram of an embodiment of uplink HARQ operation in accordance with the principles of the present invention.

Referring to FIG. 3 as an example of UL HARQ operation for the first embodiment, base station 12 transmits the UL-MAP which is received by C-RN 14 and mobile station 16 (Step S126). Mobile station 16 transmits unicast traffic on the uplink (Step S128). The unicast traffic is received by C-RN 16 in some corrupt/invalid form and C-RN 14 transmits an RN_RN-REP management control message indicating NACK to base station 12 (Step S130). Base station 12 transmits the UL-MAP and uplink HARQ NACK information element (which is contained in the UL-MAP) to mobile station 16 (Step S132). That transmission from base station 12 is also monitored by C-RN 14. Mobile station 16 retransmits the unicast traffic on its uplink (Step S134). In the case of the example shown in FIG. 3, that transmission is successfully received by C-RN 14 which in turn transmits an R_RN-REP MAC management control message to base station 12 followed by the actual relay of the traffic (Step S136). Of note, although a single mobile station 16 is shown in FIG. 3, it is understood that, because C-RN 14 is generating the HARQ ACK/NACK, that C-RN 14 can combine multiple ACK/NACK messages and from multiple mobile stations 16 and transmit them in single message to base station 12.

In accordance with the second embodiment for UL HARQ operation, the HARQ packets are combined at base station 12. Such is useful in the case where a mobile station 16 has more than one C-RN 14 in a macro UL diversity arrangement. In accordance with this second embodiment, C-RN 14 relays HARQ bits to base station 12 and base station 12 combines and creates the UL HARQ ACK/NACK message. Resources for C-RN 14 UL unicast traffic relay are assigned in accordance with this embodiment in an arrangement such that resource is predictable and can be easily assigned. In other words, unlike the first option, C-RN 14 need not pre-allocate channel resources to ensure successful transmission.

Figure 4:
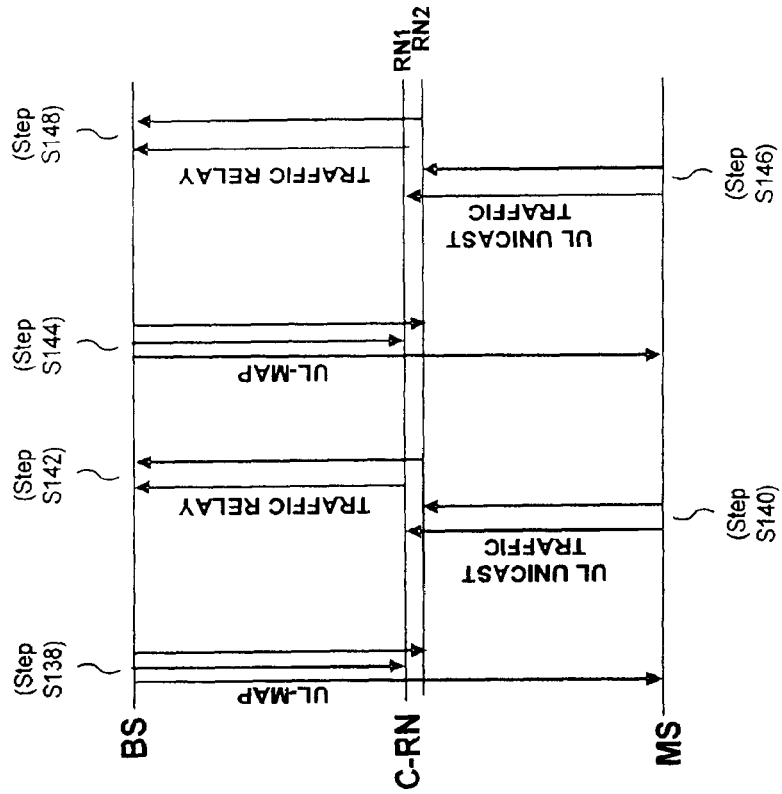
FIG. 4 is an information flow diagram of another embodiment of uplink HARQ operation in accordance with the principles of the present invention.

An example of UL HARQ operation in accordance with the second embodiment is described with reference to FIG. 4. FIG. 4 shows two C-RN 14s, labeled ("RN1" and "RN2") in FIG. 4 for ease of explanation. Initially, base station 12 transmits the UL-MAP to mobile station 14 (Step 138) RN1 and RN2 monitor this transmission and understand the resource allocation to mobile station 16. Mobile station 16 transmits unicast traffic on the uplink (Step S140). The signal is received by RN1 and RN2 which in turn relay the signal to base station 12 (Step S142) without combining. Any combining is done by base station 12. Accordingly, it is possible that one of the C-RN 14 devices indicates an ACK while the other indicates a NACK. Base station 12, through the UL-MAP can indicate the HARQ status to mobile station 16 (Step S144) with the process repeating as necessary with respect to the transmission or retransmission of traffic (Steps S146 and S148).

The present invention provides an arrangement under which UL control channel payload is relayed by C-RN 14 to base station 12. The UL control channel is used to facilitate DL transmission and includes a channel quality indication channel ("CQICH") and a downlink HARQ acknowledgement channel (DL HARQ ACK CH"). In accordance with the present invention, relay node 14 (C-RN 14) detects the uplink control channels corresponding to the mobile stations it serves. C-RN 14 combines the information carried in the UL control channels received from the multiple mobile station 16 into MAC layer messages to send to base station 12. Because the uplink resource is used for control channel relay by C-RN 14 is predictable, the base station 12 can reserve wireless communication channel resources for each C-RN to dedicate this resource for control channel relay.

Periodically, mobile station 16 may send a bandwidth request, or perform periodic ranging or HO ranging. With periodic type requests such as these, it is noted that the operation of code transmission and capture with respect to UL-MAP transmission by base station 12 and processing by mobile station 16 are the same as initial ranging, described above. Once the code has been captured, C-RN 14 combines the bandwidth request, periodic ranging and HO ranging messages from multiple mobile stations 16 and transmits the combined messages to base station 12. Once the code is captured, operation to process and address the bandwidth request, periodic ranging or HO ranging can proceed as is known in the art, such as using the IEEE 802.60e standard.

Figure 5:
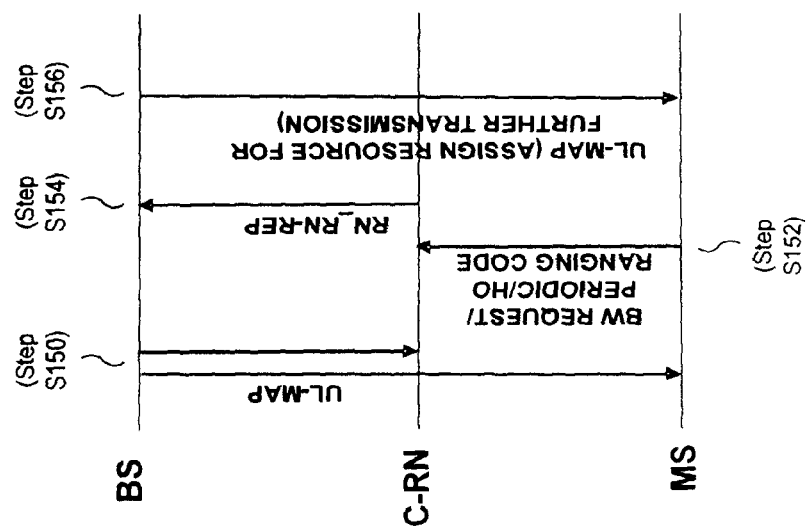
FIG. 5 is an information flow diagram of a bandwidth request, periodic ranging and handoff ranging process in accordance with the principles of the present invention.

The bandwidth request, periodic ranging and HO ranging process of the present invention is described with reference to the information flow diagram of FIG. 5. Initially, base station 12 transmits the UL-MAP to mobile station 16 (Step 150). UL-MAP transmission is also monitored by C-RN 14. During operation, mobile station 16 transmits a bandwidth request, periodic ranging or HO ranging code (Step S152). This transmission is received by C-RN 14. C-RN 14 combines the information related to this transmission with other bandwidth request, periodic ranging or HO ranging transmissions received from other mobile stations 16 (not shown) and generates and transmit a message to base station 12 in the form of an RN_RN-REP control message (Step S154). Base station 12 transmits a UL-MAP to mobile station 12 which includes an assignment of resources for further processing relating to the bandwidth request, periodic ranging or HO ranging (Step S156).

The present invention provides MAC management messages to support the operations described herein. In particular, the RN-RN REP response message described above and the RN_BS IND indication message described above are defined herein. Each is discussed in detail.

The RN-RN REP response report message enables the C-RN 14 to report to base station, (1) the ranging code captured and the timing, frequency and power level adjustment needed for initial ranging, (2) the CQICH information collected from various mobile stations 16, (3) the DL HARQ ACK information collected from various mobile stations 16, and (4) the uplink traffic relay for the combined HARQ status received from mobile stations 16.

An exemplary arrangement of an RN-RN REP MAC management message is described with reference to FIG. 6. Report message format table 20 includes a syntax field 22 and the field size 24, in bits, of the corresponding field 22. Of note, the field size 24 shown in FIG. 6 is merely exemplary, it being understood that the field size 24 corresponding to each field 22 within the report message can be larger or smaller depending on the desired implementation. As such, the present invention is not limited to the specific field size 24 shown in FIG. 6.

In addition, it is contemplated that the report NACK message may include fewer fields 22 and report types as shown in FIG. 6. The report message includes a management message type field and a field defining the number of possible report types for which information is included in the report message. The management message type field is used to indicate that the MAC message is a report message. The report message also includes a report type field to identify the corresponding types of data present in the report message. For example, where the two bit field indicating the report type is "00," the following fields include a four bit field for the number of the ranging codes captured and, for each captured ranging code from mobile stations 16, the corresponding ranging code attributes. Where the ranging code is equivalent to an initial ranging code, fields are provided for timing adjustment, power level adjustment, offset frequency adjustment and ranging status.

Regarding ranging code attributes, for example, the first 8 bits can represent the 8 significant bits of the frame number of the OFDM 8 frame where the mobile station 16 sent the ranging code. Bits 8 through 15 can be used to indicate the ranging code index that was sent by the mobile station 16. Bits 16 through 21 can be used to indicate the OFDM sub-channel reference that was used to transmit the code and bits 22 through 31 can be used to indicate the OFDM time symbol reference that was used to transmit the ranging code. Where the ranging code index indicates timing adjustment, a signed 32 bit number can be used to represent the timing adjustment where each unit is specific to the physical transmission. Where the ranging code index indicates a power level adjustment, the power level adjustment can indicate and offset in 0.25 dB increments. Regarding the offset frequency adjustment, the adjustment can be indicated which each adjustment unit is 1 Hz. Finally, the ranging status can be used to indicate whether the uplink transmission is received within acceptable limits by the C-RN 14.

Where report type is a "01," indicating, for example, CQICH information, a field is provided to indicate the number of relay nodes for which CQI information has been collected, and fields for the reporting the CQI payload. For example, the CQI collected payload can be a five bit or six bit field for each mobile station 16 for which CQI has been collected. The CQI payload and ACK payload are listed in the order of a CQICH index which is assigned by C-RN 14 to mobile station 16 being serviced by the C-RN 14.

Where the report type is a "10" indicating the collection of HARQ ACK information, a field is provided to indicate the quantity of mobile station 16 for which HARQ is being reported. Where the report type is indicated as a "11," indicating for example, the reporting of combined UL traffic relay HARQ status information, a field is provided to indicate the number of mobile station 16 for which the HARQ status is being reported, and a one bit field to report each of the uplink HARQ status bits. The UL HARQ status used to indicate whether the UL transmission was received within acceptable limits by the C-RN 14.

The indication MAC management message (RN_BS-IND) is explained with reference to FIG. 7. The indication messages, as discussed above, are sent by base station 12 to C-RNs 14 to enable base station 12 to indicate the UL CIDs to a C-RN 14 for subsequent monitoring and relaying of traffic and management information. In the case where efficient ranging is supported, the assigned dedicated ranging resource, i.e., code index, is included in the indication message to a C-RN 14. Ranging means that mobile station 16 initially sends ranging codes to base station 12 and, if the base station 12 or C-RN/16 needs to make adjustment, it does so and assigns ranging codes at the same time.

Figure 7:
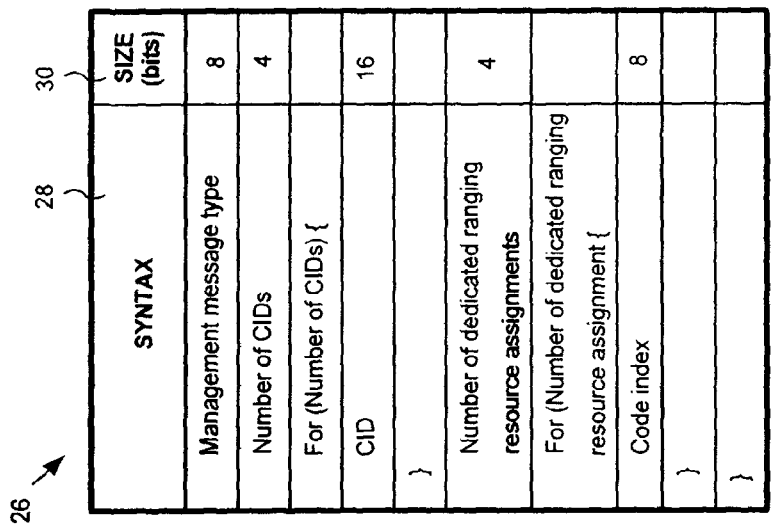
FIG. 7 is a table of an exemplary arrangement of a MAC layer indication management message constructed in accordance with the principles of the present invention.

FIG. 7 shows table 26 which provides an exemplary field format for the indication MAC message. Table 26 includes syntax field 28 and field size 30. As with the discussion above regarding the report message, the fields and sizes shown are merely exemplary, it being understood that the field size is not limited to the size shown in FIG. 7 and the specific fields and arrangement of the fields shown in syntax column 28 are not considered limiting. The MAC type field is used to indicate that the MAC message is an indication message (RN_B-S_IND). A 4 bit field is also provided to indicate the number of CIDs for which information is included.

For each of the CIDs, the CID is included as well as an indication of the number of dedicated ranging resource assignments for each CID. For each of the dedicated ranging resource assignments, a code index field is provided.

The present invention advantageously provides an imbalanced relay system which parlays the typical high quality transmission associated with the base station 12 to relay node 14 due to the stationary nature of relay node 14 which in turn allows a high data rate. As such, relay node 14 is able to combine various messages received from multiple mobile stations 16 and transmit those in a single, high data rate, packet to base station 12. The result is that system designers are relieved from concerns over mobile station uplink PAPR, and the DL/UL link budget imbalance is reduced. The present invention also avoids a situation where a relay node 14 would have to re-fragment DL transmission from relay node 14 to mobile station 16. Instead, conventional transmission is used on the DL because the base station's ability to transmit at a higher power level on the downlink than the mobile station can transmit on the uplink. The UL is preserved. The present invention may therefore allow the use of OFDM to gain the benefits therefrom, but avoids the need to implement a complex relay that accommodates both UL and DL relay operations.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of operating a relay node in a wireless network to relay communications between a mobile device and a base station, the method comprising:
    receiving an initial ranging signal transmitted by the mobile device, the initial ranging signal having ranging code attributes associated therewith;
    generating a relay node report signal, the relay node report signal conveying:
       the ranging code attributes;
       power data and timing adjustment data based on the received initial ranging code signal; and
       channel quality indication information received from at least one mobile device; and
    relaying at least a portion of traffic in one direction between the mobile station and the base station, wherein no traffic is relayed in a second direction between the mobile station and the base station.

2. The method of claim 1, wherein the one direction is an uplink direction from the mobile device to the base station.

3. The method of claim 1, wherein the one direction is a downlink direction from the base station to the mobile devices.

4. The method of claim 2, further comprising receiving a relay node indication signal from the base station, the relay node indication signal conveying an uplink connection identifier.

5. The method of claim 4, wherein relaying at least a portion of traffic in one direction between the mobile station and the base station includes relaying communications associated with the uplink connection identifier between the mobile device and the base station.

6. The method of claim 2, wherein generating a relay node report signal includes generating a relay node report signal conveying uplink hybrid automated repeat request messages received from a plurality of mobile devices.

7. The method of claim 2, wherein the relay node report signal conveys data indicating whether an uplink transmission received by the relay node from the mobile device was received within acceptable limits.

8. The method of claim 2, wherein the relay report signal conveys data indicating whether uplink transmissions received by the relay node from each of a plurality of mobile devices was received within predetermined acceptable limits.

9. The method of claim 2, further comprising combining information conveyed in uplink control channels associated with multiple mobile devices for transmission to the base station.

10. The method of claim 9, wherein combining information conveyed in uplink control channels comprises combining the information conveyed in the uplink control channels into media access control (MAC) layer messages for transmission to the base station.

11. A relay node for relaying communications between a mobile device and a base station in a wireless network, the relay node comprising:
    at least one processor; and
    at least one memory device configured to store instructions for execution by the processor, the instructions comprising instructions executable:
       to receive an initial ranging signal transmitted by the mobile device, the initial ranging signal having ranging code attributes associated therewith;
       to generate a relay node report signal, the relay node report signal conveying:
          the ranging code attributes;
          power data and timing adjustment data based on the received initial ranging code signal; and
          channel quality indication information received from at least one mobile device; and
       to relay at least a portion of traffic in one direction between the mobile station and the base station, wherein no traffic is relayed in a second direction between the mobile station and the base station.

12. The relay node of claim 11, wherein the one direction is an uplink direction from the mobile device to the base station.

13. The relay node of claim 11, wherein the one direction is a downlink direction from the base station to the mobile devices.

14. The relay node of claim 12, wherein the instructions further comprise instructions executable to receive a relay node indication signal from the base station, the relay node indication signal conveying an uplink connection identifier.

15. The relay node of claim 14, wherein the instructions executable to relay at least a portion of traffic in one direction between the mobile station and the base station include instructions executable to relay communications associated with the uplink connection identifier between the mobile device and the base station.

16. The relay node of claim 12, wherein the instructions executable to generate a relay node report signal comprises instructions executable to generate a relay node report signal conveying uplink hybrid automated repeat request messages received from a plurality of mobile devices.

17. The relay node of claim 12, wherein the relay node report signal conveys data indicating whether an uplink transmission received by the relay node from the mobile device was received within acceptable limits.

18. The relay node of claim 12, wherein the relay report signal conveys data indicating whether uplink transmissions received by the relay node from each of a plurality of mobile devices was received within acceptable limits.

19. The relay node of claim 12, wherein the instructions further comprise instructions executable to combine information conveyed in uplink control channels associated with multiple mobile devices for transmission to the base station.

20. The relay node of claim 19, wherein the instructions executable to combine information conveyed in uplink control channels comprise instructions executable to combine the information conveyed in the uplink control channels into media access control (MAC) layer messages for transmission to the base station.

* * * * *